United States Patent [19]

Elliott et al.

[11] 4,098,710

[45] Jul. 4, 1978

[54] OIL-SOLUBLE ADDITION PRODUCTS OF AN ETHYLENE-PROPYLENE COPOLYMER AND ANIONICALLY POLYMERIZABLE MONOMER HAVING UTILITY AS MULTIFUNCTIONAL V.I. IMPROVER FOR LUBRICATING OILS

[75] Inventors: Robert L. Elliott, Scotch Plains; Brooke Gardiner, Jr., Mountainside, both of N.J.

[73] Assignee: Exxon Research & Engineering Co., Linden, N.J.

[21] Appl. No.: 696,786

[22] Filed: Jun. 16, 1978

Related U.S. Application Data

[63] Continuation-in-part of Ser. No. 680,077, Apr. 26, 1976, Pat. No. 4,051,050.

[51] Int. Cl.² .............................................. C10M 1/32
[52] U.S. Cl. .......................... 252/51.5 A; 252/51.5 R; 252/55; 260/878 R; 526/19; 526/49; 526/52; 526/58
[58] Field of Search ................ 252/51.5 R, 51.5 A, 252/55; 260/878 R; 526/19, 49, 52, 58

[56] References Cited

U.S. PATENT DOCUMENTS

| | | | |
|---|---|---|---|
| 2,800,450 | 7/1957 | Bondi et al. | 252/51.5 R X |
| 3,388,067 | 6/1968 | Takashima et al. | 252/55 |
| 3,687,849 | 8/1972 | Abbott | 252/51.5 A X |
| 3,687,905 | 8/1972 | Dorer | 252/51.5 A X |
| 3,761,458 | 9/1973 | Holler et al. | 252/51.5 A X |
| 3,769,216 | 10/1973 | Gordon et al. | 252/51.5 A X |
| 3,785,980 | 1/1974 | Wilgus | 252/51.5 R X |
| 3,842,010 | 10/1974 | Pappas et al. | 252/51.5 A X |
| 3,864,268 | 2/1975 | Culbertson et al. | 252/51.5 A X |
| 3,879,304 | 4/1975 | Waldbillig | 252/51.5 A |
| 3,931,024 | 1/1976 | Hu | 252/51.5 A X |

*Primary Examiner*—Delbert E. Gantz
*Assistant Examiner*—Andrew H. Metz
*Attorney, Agent, or Firm*—Roland A. Dexter; Frank T. Johmann

[57] ABSTRACT

An oil-soluble addition product of a catalyzed condensation reaction of an anionically polymerizable monomer, preferably an ethylenically unsaturated nitrogen-containing monomer, e.g. acrylonitrile, with an oxidized copolymer of ethylene and at least one $C_3$ to $C_{50}$ alpha monoolefin, e.g. propylene, said addition product in its preferred form containing from about 0.005 to 2% by weight nitrogen and having a number average molecular weight of from about 1000 to 500,000, has utility as a multifunctional V.I. improver or dispersant for lubricating oils.

18 Claims, No Drawings

OIL-SOLUBLE ADDITION PRODUCTS OF AN ETHYLENE-PROPYLENE COPOLYMER AND ANIONICALLY POLYMERIZABLE MONOMER HAVING UTILITY AS MULTIFUNCTIONAL V.I. IMPROVER FOR LUBRICATING OILS

RELATED CASES

This application is a continuation-in-part of Ser. No. 680,077 filed Apr. 26, 1976 now U.S. Pat. No. 4,051,050.

BACKGROUND OF THE INVENTION

1. Field of the Invention

This invention relates to nitrogen-containing polymeric compounds. More particularly, this invention relates to viscosity improving polymeric additives which improve sludge dispersancy, pour point depressancy and oxidative stability of oleaginous compositions and to the preparation of said additives. Broadly, the novel additives are nitrile-containing copolymers prepared by a condensation reaction of reactants such as acrylonitrile onto oxidized ethylene-propylene copolymers induced by a thermal means such as heat or in the presence of a strong base catalyst such as sodium hydroxide.

2. Description of the Prior Art

The literature abound with discussions of multi-functional viscosity index (V.I.) improvers, usually containing nitrogen to enhance their dispersant activity including polymeric nitrile-containing substances, as lubricating oil additives with detergent-dispersant and other properties.

The preparation of such multifunctional V.I. improving polymeric substances according to the prior art included: copolymerization of one or more olefins with a nitrile-containing monomer (U.S. Pat. No. 3,445,387); free radical-grafting a hydroperoxidized ethylene copolymer with a polar vinylidene monomer, such as acrylonitrile (see U.S. Pat No. 3,404,091); reacting a nitrile-containing compound with a reactive copolymer such as is obtained from free radical-grafting of maleic anhydride to polyisobutylene (see U.S. Pat. No. 3,448,049); free radical-grafting an ester of an amino alcohol onto an oxidized interpolymer of ethylene and propylene (see U.S. Pat. No. 3,687,849); and, thermally reacting amines with an oxidized ethylene-propylene copolymer (see U.S. Pat. No. 3,864,268).

These processes which utilize free radicals have certain disadvantages, including irreversible crosslinking of the copolymer and homopolymerization of monomeric components. One of such disadvantages is shown in U.S. Pat. No. 3,236,917 wherein the initiation of the desired addition reaction by the generation of free radicals also provides grafting of a single molecule of maleic anhydride onto two copolymer chains thereby irreversibly crosslinking the copolymer and markedly decreasing its solubility in oil. One approach to overcoming this disadvantage is shown in U.S. Pat. No. 3,378,492 which teaches grafting an unsaturated hydrocarbon polymeric compound, e.g. polybutadiene, directly with an unsaturated, polar, nitrogen-containing organic compound, e.g. acrylonitrile, by a free radical initiated reaction.

Another approach to preparing an oil-soluble nitrogenous ashless dispersant involves reacting an alkali metal salt of a long-chain ketone with acrylonitrile (see U.S. Pat. Nos. 3,565,803 and 3,723,501). Unfortunately, formation of the dialkyl ketone precursor is by ozonization which is an expensive and hazardous process involving dimethyl sulfide, an environmentally toxic agent.

Also taught as a multifunctional additive for lubricating oils is the anionic-graft polymer of a lithiated ethylene-propylene-hexadiene terpolymer with an amino methacrylate monomer (see U.S. Pat. No. 3,879,304).

STATEMENT OF THE INVENTION

It has been found that multifunctional viscosity improvers of enhanced dispersancy can be obtained by condensing an oxidized copolymer of ethylene and one or more $C_3$ to $C_{50}$, preferably $C_3$ to $C_{18}$, alpha monoolefins with a $C_3$ to $C_{50}$ anionically polymerizable monomer by effecting the condensation through physical means, i.e. heat, or catalytic means, i.e. the presence of a strong base.

This finding has, in accordance with this invention, made possible the realization of a new class of products which in their preferred form are useful as additives for lubricating oil compositions.

In their broadest form, this novel class of products of the invention can be characterized as polymeric addition products of an oxidized (as by mastication in an oxygen-containing environment) copolymer of ethylene and at least one $C_3$ to $C_{50}$ alpha olefin monomer condensed with a monomeric compound which is capable of undergoing a condensation reaction as hereinafter described.

In their preferred form the products of the invention are oil-soluble, functionalized polymers containing from about 0.005 to 2.0, preferably 0.05 to 0.8, percent by weight nitrogen which demonstrate outstanding dispersancy and have utility as ashless sludge dispersants.

Lubricating oil compositions of this invention comprise a lubricating oil and a minor but dispersing proportion of an oil-soluble functionalized polymer of an addition product of the condensation reaction of an anionically polymerizable monomer and an oxidized copolymer of ethylene and at least one $C_3$ to $C_{50}$, preferably $C_3$ to $C_{18}$, alpha monoolefin, said polymer containing from about 0.005 to 2.0, preferably 0.05 to 0.8 by weight nitrogen and having a number average molecular weight ($\overline{M}n$) of from about 1000 to 500,000 (preferably from about 1,000 to 10,000 for dispersant applications and from 10,000 to 200,000 for V.I. improver dispersant applications). The polymeric addition products of the invention are suitable for lubricating oil applications when they possess sufficient oil-solubility, i.e. at least about 10 weight percent at 20° C. based on the total weight of the lubricating oil composition, however, when oil-insoluble these polymeric addition products of the invention have application as oil-resistant rubber in seals and gaskets for automobile automotive transmissions, thermoset resins for encapsulating electronic devices, etc., or other such uses as will be apparent from the following discussion.

The term "copolymer" as used herein and in the appended claims, refers to copolymers derived from essentially ethylene and propylene; however, such copolymers may contain minor amounts, i.e. up to 20 mole percent, preferably about 1 to about 7 mole percent, based on the molar amounts of the monomeric ethylene and propylene units in the copolymer, of polymerized units derived from other olefin monomers. Such other olefin monomers include olefins of the general formula $RCH=CH_2$, in which R is an aliphatic or cycloaliphatic radical of from 2 to about 48 carbon atoms, for example, 1-butene, 1-pentene, 4-methyl-1-pentene, 1-hexene, 1- heptene, 1-octene, 1-nonene, 1-decene, 4-methyl-1-nonene, 5,5-dimethyl-1-pentene; 5-methyl-1-hexene; 4-methyl-1-heptene; 5-methyl-1-heptene; 6-methyl-1-heptene, 4,4-dimethyl-1-hexene; 5,6,6-trimethyl-1-heptene, etc. Such other olefins also include monomers having a plurality of double bonds, in particular diolefins containing from about 4 to about 26 carbon atoms, e.g. 1,3-butadiene, 1,4-pentadiene, 2-methyl-1,5-hexadiene, 1,7-octadiene, etc. and preferably non-conjugated diolefins such as vinylidene norbornene, 5-methylene-2-norbornene and 1,4-hexadiene.

Suitable ethylene copolymers contain from about 2 to about 98 weight percent of ethylene e.g. 20 to 80 mole % ethylene, and one or more $C_3$ to $C_{50}$ alpha-monoolefins, preferably propylene with a degree of crystallinity of less than 25 weight percent as determined by X-ray and differential scanning calorimetry. More usually the ethylene-propylene copolymers contain from about 20 to about 80, preferably from about 35 to about 65 mole percent propylene, have a number average molecular weight ($\overline{M}n$) of from about 1000 to about 500,000, preferably about 10,000 to about 200,000, optimally from 20,000 to 100,000.

Methods of preparation of the copolymers are well known including description in U.S. Pat. Nos. 2,700,633; 2,726,231; 2,792,288; 2,933,480; 3,000,866; 3,063,073; 3,093,621 and literature reviews such as "Polyolefin Elastomers Based on Ethylene and Propylene," by F. P. Baldwin and G. VerStrate in Rubber Chem. & Tech. Vol. 45, No. 3, 709-881, (1972) and "Polymer Chemistry of Synthetic Elastomers," edited by Kennedy and Tornqvist, Interscience, N.Y. 1969.

In accordance with this invention, these copolymers which as indicated include terpolymers, for example, a terpolymer of ethylene, propylene and a non-conjugated diene such as 2-ethylidene-5-norbornene can be condensed according to the invention provided the terpolymer is suitably oxidized whereby sites for the catalyzed addition are created. Ethylene-propylene-non-conjugated diolefin terpolymers are known articles of commerce, including VISTALON ®, an elastomeric copolymer of ethylene, propylene and 5-ethylidene-2-norbornene, marketed by Exxon Chemical Co., New York, N.Y., and Nordel ®, a copolymer of ethylene, propylene and 1,4-hexadiene, marketed by E. I. duPont de Nemours & Co., Wilmington, Dela.

OXIDATION OF THE COPOLYMER

The oxidation can be accomplished by contacting to copolymer under suitable conditions of temperature and at atmospheric or elevated pressures, with an oxidizing agent such as air or free oxygen, or any oxygen-containing material capable of releasing oxygen under the oxidation conditions. If desired, the oxidation can be conducted in the presence of known oxidation catalysts such as platinum or a platinum group metal, and compounds containing metals such as copper, iron, cobalt, cadmiun, manganese, vanadium, etc. The oxidation can be carried out by methods described in U.S. Pat. Nos. 2,982,728; 3,316,177; 3,153,025; 3,365,499; 3,544,520 and 3,864,268.

Generally, the oxidation can be carried out over a wide temperature range depending upon the activity of the agent used. For example, with air, temperatures in the range of 35°-425° C. have been used. Further, depending upon the rate desired, the oxidation can be conducted at sub-atmospheric, atmospheric or superatmospheric pressures, and in the presence of a copolymer solvent. The conditions of temperature, pressure, oxygen content of the oxidizing agent, the rate of introducing the oxidizing agent, the catalyst employed, if any, etc., are correlated and controlled by those skilled in the art, so as to obtain the desired optimum results.

Oxidation of the copolymers and terpolymers dissolved in a solvent such as mineral oil is conveniently carried out, either in batches or continuously, in a stirred reactor with air, or air prediluted with an inert gas such as nitrogen or carbon dioxide so as to minimize explosion hazards. The air, or diluted air, may be introduced into the oil-polymer solution in a finely divided state through the use, for example, of sparger tubes fitted with porous ALUNDUM ®, or fritted glass thimbles, or similar means possessing a foraminiferous like structure, at a temperature in the range of about 80° to 300° C., preferably 100° to 230° C. Rapid agitation of the reactor contents, as for example, for means of a turbomixer is desirable in large batches, to ensure an optimum reaction rate and a low oxygen content in the off-gas.

In general, in the range of 0.5 to 90, e.g., 4 to 60 weight percent of the oil copolymer solution will be copolymer. Usually, about 20 to 60 weight percent of the solution will be copolymer when the polymer is of low mol. wt., e.g., with a number average molecular weight ($\overline{M}n$) less than 20,000. For copolymers with $\overline{M}n$ equal to or greater than 20,000, the preferred concentrations are in the range of 4 to 20 weight percent copolymer, based on the total weight of the oil-copolymer solution.

A wide variety of mineral lubricating oils which widely range in viscosity and crude source, may be used as solvents for the polymer-oil solutions to be oxidized. The oils may be derived from Pennsylvania, Midcontinent or Coastal crudes, Middle East crudes, Venezuelan crudes, etc., and may range in viscosity from about 5 to 1000 SUS at 100° F., preferably 10 to 600 SUS at 100° F., most preferably 80 to 200 SUS at 38° C. They may be straight-run distillates in the lubricant range, e.g., boiling above 315° C., or may have been further refined by deasphalting; dewaxing; solvent extracted; treated with sorbents; or refined by hydrogenation; etc. Also suitable are synthetic hydrocarbon oils in the lubricant range made by polymerization, oligomerization, alkylation of aromatics with olefins, and the like.

Oxidation of the oil-copolymer solution is conducted for a time sufficient to impart to the solution a combined oxygen content of about 0.01 to 10.0, e.g., 0.1 to 8, preferably 0.1 to 5.0 weight percent, depending on the composition of the oil, the copolymer and the concentration of copolymer in solution.

A measure of the degree of oxidation is the specific absorption exhibited by oxygen containing group functionality about 5.8 microns in the infrared. Oxygen group functionality may conveniently be measured with an infrared spectrometer using 0.05 mm to 0.5 mm specimen thickness and sodium chloride cells. The oxygen group absorption in the useful range of oxidized solutions will usually be in the range of about 0.05 to 5.0 (based on a 0.5 mm cell) and depending on the oil, polymer and polymer concentration. Usually, the lower absorption values can be directly measured in a 0.5 mm cell, while higher absorption values are best measured in thinner cells, e.g., 0.1 mm or 0.2 mm cells and the values may be extrapolated to a 0.5 mm cell, if desired for comparison purposes, as was done in some of the following examples. As used herein, such terms as "oxidized," or "oxidized oil copolymer solution" etc. indicates that air or oxygen containing gas is used for the oxidation, and precludes the use of other oxidative reagents such as ozone.

Alternatively the copolymer can be oxidized in the absence of a solvent as by oxidative degradation of the copolymer. This oxidation approach is well known in the art (see French Published Application No. 75.23806) whereby oxygen is incorporated into the copolymer by an air-mastication procedure. This procedure may be done with a single piece of equipment or in stages. Useful equipment includes Banbury mixers and mills wherein the copolymer is readily exposed to air, which devices may be enclosed in jacketed containers through which a heating medium may be passed such as superatmospheric steam, or heated DOWTHERM ®. When oxidation resulting from the air-mastication has reached a desired level i.e. at least about 0.005 weight percent oxygen as determined by oxygen uptake in said copolymer, mineral oil may be added to provide a concentration of the oxidized copolymer in the range of about 5 weight percent to 50 weight percent based on the weight of the total resulting solution.

Where oxidation is provided by air-mastication, the copolymer is limited to ethylene and one or more alpha-monoolefins having from 3 to 50 carbons and preferably propylene to avoid deleterious crosslinking during oxidation.

CATALYZED CONDENSATION REACTANT

Broadly, the catalyzed condensation reactants contemplated by the present invention are anionically polymerizable monomers generally consisting of carbon, hydrogen and a heteroatom to provide functionality such as nitrogen (preferred herein), oxygen, sulfur, boron, phosphorous, silicon, lithium, etc. The base catalyzed condensation reactant may also contain substituent groups such as ketone, hydroxyl, ether, mercapto, sulfide, sulfoxide, sulfonyl, etc. Generally, these reactants will contain about 3 to 80 carbon atoms and must contain at least one electron withdrawing group in such proximity to the unsaturation that the olefinic bond is thereby activated allowing for a condensation reaction.

Thus in its broadest form, the base catalyzed condensation reactant may be selected from a broad group of substituted vinylidines represented by the general formula:

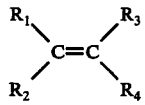

wherein $R_1$, $R_2$ and $R_3$ may be the same or individually different and are independently selected from the class consisting of hydrogen and $R_4$, and $R_4$ is selected from the class consisting of $C_1$ to $C_{30}$ straight and branched chain alkyl, arylalkyl, cycloalkyl, alkenyl, arylalkenyl and cycloalkenyl moieties and/or one or more reactive groups of the class consisting of alkyl unsaturation, carboxyl, epoxide, thiol, carbonyl, isocyanate, thionyl, amido, imino, acylhalide, halo, thiolic anhydride, thionic anhydride, dithionic anhydride, disubstituted amino, trisubstituted amino, ureido, isourea and dicarboxylamic acid anhydride or one-half of cyclic dicarboxylic acid anhydrides as in maleic anhydride or one-half of cyclic thiolic anhydride or one-half of cyclic thionic anhydride or one-half of cyclic dithionic anhydride or one-half of cyclic dicarboxylic amic acid anhydride or one-half of cyclic N $C_{1-18}$ hydrocarbyl imides such as N-dodecylmaleimide. Non-limiting examples include: alpha-chloroacrylonitrile; 2-chloroethyl acrylate; N,N-dibutyl acrylamide, acrylamide; N-t-octyl acrylamide; thio-acrylamide; N-n-dodecylacrylamide; N-acryloyl morpholine; thionacrylic acid; ammonium acrylate; acrolein, ethyl vinyl ketone; 1-chloro-butenyl-ethyl ketone; vinyl chloride; 4,4,4-trichloro-butene-1; p-chlorallylbenzene; p-(chloromethyl)-styrene; 4-chloro-1-vinyl naphthalene; vinylidene chloride; 1-chloro-1-benzyl ethylene; alpha-ethyl-m-(trichloromethyl)-styrene; methyl crotonate; allyl benzene; methyl isoroppenyl ketone; maleic anhydride; fumaryl chloride maleimide; N-octylmaleimide.

Other monomers are N,N-diisopropylcarbodiimide; N,N-dimethylcarbodiimide; and N,N'-methylethylcarbodiimide (the latter three compounds being representative of a highly useful and preferred class of N,N(di $C_{1-10}$ hydrocarbyl) carbodiimides.

A preferred class of nitrogen-containing condensation reactants to which the present invention is directed have the formula:

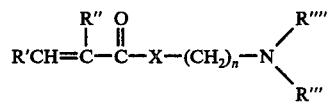

wherein X is oxygen or an NR" group, n is a whole number from 2 to 5, R' and R" may be the same or different and are individually selected from the class consisting of hydrogen and a $C_1$ to $C_4$ alkyl group, R''' and R'''' are each $C_1$ to $C_{12}$, preferably $C_1$ to $C_4$, hydrocarbyl groups, e.g. alkyl groups. The various R groups may be the same or different. Amino methacrylates such as dialkylaminoethylmethacrylates are particularly useful.

Specific examples of compounds encompassed within the preferred class of nitrogen-containing condensation reactants include dimethylaminoethyl methacrylate, diethylaminopropyl methacrylate, diethylaminopropyl methacrylamide, di(isobutyl) aminoethyl methacrylate, methylisobutylaminopropyl acrylate, 4-vinyl pyridine, ethylene imine, N-vinyl pyrrolidone, carbodiimide, etc. Mixtures of various nitrogen-containing monomers may be reacted as well as the individual monomers with the oxidized ethylene copolymers.

The most preferred nitrogen-containing condensation reactants to which the present invention is particularly directed have the formula:

where $R^V$ is a hydrogen atom or a lower alkyl, e.g., methyl, ethyl and the like, X is a hydrogen atom, a halogen atom, a cyano or a lower alkyl group, e.g. methyl, ethyl, propyl, butyl and the like. Non-limiting examples of nitrile monomers which are contemplated by the aforedescribed structure include, acrylonitrile, methacrylonitrile, vinylidene cyanide, allyl cyanide and the like. When said condensation reactant is acrylonitrile, said reaction is extremely facile so that acrylonitrile represents an optimal reactant.

PREPARATION OF THE POLYMERIC ADDITION PRODUCT

Immediately above, it has been indicated that acrylonitrile is readily condensed with an oxidized copolymer in a base catalyzed addition reaction to provide a polymeric addition product according to the invention. For purposes of this disclosure, such a condensation could be classified as a cyanoethylation reaction. Further, it has been discovered that the reactions of the invention in their preferred form are similar in many respects to a Michael condensation reaction (see A. Michael, *J. Prakt. Chem.* [2] 35, 349(1887)) which is further described in The Merck Index Eighth Edition, page 1193 under Michael Condensation (Michael Addition) which Index is published by Merck & Co. Inc. Rahway, N.J. (1968).

Usually the condensation reaction is carried out in an inert solvent. These solvents may be polar or non-polar. Illustrative hydrocarbon solvents include benzene, toluene, cumene and preferably hydrocarbons of from 6 to 10 carbon atoms such as hexane, cyclohexane and heptane. Other solvents include ethers, both aliphatic and aromatic such as diethyl ether and dimethyl ether with tetrahydrofuran being preferred. Individual solvents or mixtures may be used. A highly useful solvent is mineral oil or mixtures thereof in which the oxidized copolymer is generally prepared.

The condensation reactant may be added either batchwise or incrementally to the oxidized ethylene-propylene solution. Preferably, the reactant is added incrementally with vigorous stirring so as to obtain relatively homogeneous diffusion of the condensation reactant into the reaction mixture.

The preparation of the functionalized polymer from the oxidized copolymer is theorized to occur by inducing abstraction of the acidic proton located alpha to a carbonyl structure present in the oxidized copolymer. This inducing can be achieved either by physical means such as heat or catalytic means such as by the presence of a strong base e.g. sodium hydroxide. Oxidation of the ethylene copolymer is believed to introduce a multiplicity of complex carbonyl structures such as keto-, aldo-, acido- into the backbone of the polymeric molecules. Preparation of the addition product of the oxidized copolymer does not measurably alter these carbonyl structures since the condensation reactant is added onto said copolymer backbone by means of an induced condensation reaction.

The condensation reaction comprises contacting said substantially linear oxidized copolymer in a solvent with heat or a catalytic amount of a strong aqueous base, most usually a strong inorganic base, preferably sodium hydroxide, and an anionically polymerizable monomer preferably acrylonitrile. For purposes of this disclosure a strong base has a pH of at least about 8, preferably at least about 11. A temperature of between about 0° to 200° C. and time of 0.2 to 25 hours is normally used.

The condensation reaction can be effected by the presence of thermal energy, i.e. heat. In accordance with this method said oxidized copolymer is thermally contacted with said condensation reactant, preferably acrylonitrile. Usually, the reaction is carried out in an inert solvent such as mineral oil. In accordance with this procedure temperatures in the range of about 100° to about 200° C., preferably 140° to 150° C. and periods of between 1 and 25 hours, preferably 3-7 hours are generally useful.

The base catalyzed condensation reaction of the copolymer and the condensation reactant as noted is generally carried out in the range of between about 0° and about 100° C. and with agitation at atmospheric pressure or under superatmospheric pressure up to as high as 2000 psi. The overall time of reaction varies between about 0.2 and about 25 hours, preferably between about 0.5 and about 10 hours. The base condensation catalyst is as noted any strong base e.g. a strong organic base such as triethylamine, a strong aqueous base such as sodium hydroxide, potassium hydroxide, calcium hydroxide, barium hydroxide, etc. and alkoxides such as sodium ethoxide which provide a pH of at least about 8.

The proportions in which the above-described nitrogen-containing reactants are to be used may range widely according to the ability of said oxidized copolymer and said nitrogen-containing reactant to react with each other, but normally should range from about 0.1 to 400, preferably about 10 to about 200 parts by weight of said monomer to 100 parts by weight of said oxidized copolymer (said oxidized copolymer containing from about 0.005 to 6 weight percent, preferably 0.01 to 3 weight percent, oxygen).

It is generally desired to form oil-soluble polymeric additive products containing about 0.005 to 2%, and preferably about 0.05 to 0.8% by weight nitrogen (all of said percents by weight nitrogen values in this specification are determined by the Kjeldahl method). Products containing such quantities of nitrogen have sufficient dispersancy sites to impart multifunctionality to said copolymers whereby addition of said products enhances the lubricating performance of lubricating oils.

The polymeric additive products of the catalyzed condensation reaction of the invention broadly will contain from 0.005 percent to about 10 percent by weight nitrogen. As the nitrogen content increases above about 0.8 weight percent, the product becomes increasingly less soluble in hydrocarbons such as mineral oil whereby its utility as a hydrocarbon resistant material is increased.

POLYMERIC ADDITIVE PRODUCTS

Generally, the number average molecular weights of the additive products of the present invention, employed as lubricant additives, will be in the range of about 1000 to about 500,000 and preferably will be in the range of about 10,000 to 200,000. However, it will be understood that higher or lower molecular weight products may be prepared in accordance with the present invention, if desired. All molecular weight values set forth in this specification are number average molecular weights ($\overline{M}n$) as determined by vapor phase osmometry (VPO) and membrane osmometry (MO).

When the functionalized polymers are employed in lubricating oils, they are preferably added in proportions of about 0.01 to about 20.0% or more, preferably about 0.1 to 10.0%, and more preferably about 0.5 to 5.0 percent by weight. The proportions giving the best results will vary somewhat according to the nature of the polymer additive, the nature of the lubricating oil base stock to which it is added and the specific purpose which the lubricant is to serve in a given case. For commercial purposes, it is convenient to prepare concentrated oil solutions in which the amount of the polymer in the composition ranges from 10 to about 80% by weight, and to transport and store them in such form. In preparing a lubricating oil composition for use as a crankcase lubricant the polymeric concentrate is merely blended with the base oil in the required amount.

The products of the present invention may be employed not only in ordinary hydrocarbon lubricating oils but also in the "heavy duty" type of lubricating oils which have been compounded with such detergent type additives as metal soaps, metal phenates, metal alcoholates, thiophosphates, amines and amine derivatives, reaction products of metal phenates and sulfur, reaction products of metal phenates and phosphorous sulfides, metal phenol sulfonates and the like. The addition product additives of the present invention may be used in lubricating oils containing other additives such as barium nonyl phenol sulfide, nickel oleate, barium octadecylate, calcium phenol stearate, zinc diisopropyl salicylate, aluminum naphthenate, zinc methylcyclohexyl thiophosphate, etc.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. Hydrogenated oils, white oils, or shale oil may be employed as well as synthetic oils prepared, for example, by the polymerization of olefins or by the reaction of oxides of carbon with hydrogen or by the hydrogenation of coal or its products.

For best results the base stock chosen should normally be that of an oil which (without the new polymer additive present) gives the optimum performance in the service contemplated, e.g. lubricating oils for normal applications have a viscosity which usually ranges from about 40 to 150 seconds Saybolt viscosity at 99° C. but for the lubrication of certain low and medium speed diesel engines the lubricating oil base stock is prepared from naphthenic or aromatic crudes and has a Saybolt viscosity at 99° C. of 45 to 90 seconds and for gasoline engine service, oils of higher viscosity index are often preferred, for example, up to 75 to 100, or even higher, viscosity index.

The polymeric additive products have utility as pour depressants for hydrocarbons. This utility includes not only lubricating oil applications but also to improve the cold flow properties of distillate hydrocarbon oils, particularly those fuel oils containing a fraction boiling above 370° C. The polymers of the invention can be used alone or in combination with copolymers of ethylene and vinyl esters of lower fatty acids such as vinyl acetate. The polymers alone or in combination are added in cold flow improving amounts, i.e. from about 0.001 to 0.5 weight percent based on the weight of the middle distillate.

The invention will be further understood by reference to the following examples which include preferred embodiments.

EXAMPLE 1

To 10 g. of an oxidized/masticated ethylene-propylene copolymer (containing about 44 weight percent ethylene and about 56 weight percent propylene) of $\overline{Mn}$ 23,000 in 200 ml. of freshly distilled tetrahydrofuran (THF) maintained at ambient temperature and under a nitrogen atmosphere was rapidly added 1 g. of a 50% NaOH solution. The solution was stirred for 15 minutes while heating to 35° C. To the stirring solution was slowly added over 15 minutes, a solution of acrylonitrile (1 g. 18.5 mmole) in THF (5 ml.). The solution was heated to 40°–50° C. for 3 hours, cooled to ambient temperature, then stirred an additional 18 hours.

The condensed polymeric product was recovered by precipitation from a large volume of methanol, then washed with methanol and finally dried in a vacuum oven at about 100° C. for 18 hours, after which 7.6 g. of product was recovered. The polymeric additive product obtained contained 0.085 weight percent nitrogen (Kjeldahl).

EXAMPLE 2

Following the procedure as in Example 1, 10 g. of an oxidized/masticated ethylene-propylene copolymer (containing about 44 weight percent ethylene and about 56 weight percent propylene) of $\overline{Mn}$ 34,000 was condensed. In this example, however, the solution was heated at 45°–60° C. for 3 hours.

Precipitation yielded 9.6 g. of polymer with a nitrogen content of 0.12 weight percent (Kjeldahl).

EXAMPLE 3

Following the procedure of Example 1 with the copolymer of Example 2 yielded a novel functionalized polymer. Precipitation yielded 8.4 g. of a polymer with a nitrogen content of 0.065 weight percent (Kjeldahl).

EXAMPLE 4

Following the procedure as in Example 1 with the copolymer of Example 2, the solution was heated at reflux, ca. 66° C. for 4 hours.

Precipitation followed by a second precipitation yielded 9.4 g. of a polymeric additive product with a nitrogen content of 0.09 weight percent (Kjeldahl).

EXAMPLE 5

Following the procedure as in Example 4, an oil oxidized/masticated ethylene-propylene copolymer (containing about 44 weight percent ethylene and about 56 weight percent propylene) with an $\overline{Mn}$ 42,000 (membrane osmometry) was condensed with acrylonitrile. Precipitation yielded 9.82 g. of a product with a nitrogen content of 0.075 weight percent (Kjeldahl).

EXAMPLE 6

Following the general procedure of Example 1, an oil oxidized/masticated copolymer (containing acrylonitrile) was prepared by refluxing in THF (~66° C.) for 5.5 hours. Precipitation yielded 9.03 g. of product with a nitrogen content of 0.18 weight percent (Kjeldahl).

EXAMPLE 7

5 grams of an ethylene-propylene copolymer (contains 46 weight percent ethylene and 54 weight percent propylene) which was air oxidized from a number average molecular weight of about 72,000 to about 23,000 (membrane osmometry) was dissolved in 45 grams of Solvent 150N mineral oil and placed in a reaction vessel on an electric heater so that the temperature of the reactants could be controlled. 5.0 grams (0.094 moles) of acrylonitrile was introduced into the reaction vessel after which the reaction vessel was flushed with nitrogen and subjected to a pressure of about 2 inches of mercury which elevated pressure was maintained during the reaction period. The reaction was carried out by heating the ingredients with agitation at a temperature ranging from 128° to 140° C. for 7 hours. The reaction vessel was cooled to room temperature and the contents subjected to dialysis whereby 4.0 grams of product was obtained which contained 2.25 weight percent nitrogen (Kjeldahl). The product exhibited strong absorption at 2270 cm$^{-1}$ by infrared analysis.

EXAMPLE 8

In this example the efficacy of the polymeric additive products of this invention, particularly with regard to their unusual dispersancy properties in lubricating oil applications, is illustrated by comparison with a commercially available multifunctional V.I. improver, sold as Lz 3702 by Lubrizol Corporation of Cleveland, Ohio, in a Sludge Inhibition Bench Test (hereinafter designated SIB). The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate antiwear additive. The oil contained no sludge dispersant. A quantity of such used oil was acquired by draining and refilling the taxicab crankcase at 1000–2000 mile intervals.

The Sludge Inhibition Bench Test is conducted in the following manner: The aforesaid used crankcase oil, which is milky brown in color, is freed of sludge by centrifuging for 1 hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, on an active ingredient basis, of the particular additive being tested. Ten grams of each blend being tested is placed in a stainless steel centrifuge tube and is heated at 138° C. for 16 hours in the presence of air. Following the heating, the tube containing the oil being tested is cooled and then centrifuged for 30 minutes at about 39,000 gs. Any deposits of new sludge that form in this step are separated from the oil by decanting the supernatant oil and then carefully washing the sludge deposits with 25 ml. of pentane to remove all remaining oil from the sludge. Then the weight of the new solid sludge that has been formed in the test, in milligrams, is determined by drying the residue and weighing it. The results are reported as percent of sludge dispersed by comparison with a blank not containing any additional additive. The less new sludge formed, the larger the value of percent sludge dispersed, and the more effective is the additive as a sludge dispersant. In other words, if the additive is effective, it will hold at least a portion of the new sludge that forms on heating and oxidation stably suspended in the oil so it does not precipitate down during the centrifuging. Using the above-described test, the dispersant action of the several functionalized polymers prepared in accordance with this invention were compared with the dispersing power of a dialyzed product obtained from dialysis of a commercial dispersant previously referred to as Lz3702. Sufficient dialyzed residue which analyzed about 0.4 weight percent nitrogen, was dissolved in S-150N mineral oil to provide a 10 percent active ingredient concentrate. The dialyzed residue and polymer products of the invention were appropriately diluted in mineral oil to furnish the 0.025, 0.05 and 0.1 weight percent of added additive to the used oil. The test results are given in the Table below.

TABLE

| Example | Product of Example No. | Concentration gms. Product/10 g.Used Oil | Percent Sludge Dispersed |
|---|---|---|---|
| 8-1 | 1 | 0.1 | 77.9 |
| | | 0.05 | 65.2 |
| | | 0.025 | 41.4 |
| 8-2 | 2 | 0.1 | 84.8 |
| | | 0.05 | 53.6 |
| | | 0.025 | 29.0 |
| 8-3 | 3 | 0.1 | 76.8 |
| | | 0.05 | 32.6 |
| | | 0.025 | 21.5 |
| 8-4 | 4 | 0.1 | 90 |
| | | 0.05 | 60.2 |
| 8-5 | 5 | 0.1 | 88.0 |
| | | 0.05 | 65.8 |
| 8-6 | 6 | 0.1 | 90.7 |
| | | 0.05 | 65.8 |
| 8-7 | 7 | 0.1 | 80 |
| | | 0.05 | 64 |
| | | 0.025 | 22 |
| 8-8 | Dialyed Lz3702 (Comm.Dispersant) | 0.1 | 89 |
| | | 0.05 | 74 |
| | | 0.025 | 31 |

The results of this Table can be summarized as showing the nitrogen-containing functionalized polymers of the invention to have comparable or superior dispersancy at 1 and 0.5 weight percent additive levels over that shown by a commercially available multifunctional V.I. improver.

The invention in its broader aspect is not limited to the specific details shown and described and departures may be made from such details without departing from the principles of the invention and without sacrificing its chief advantages.

What is claimed is:

1. A lubricating oil composition comprising a major amount of lubricating oil and about 0.1 to 10 wt. % of an oil soluble addition product having a number average molecular weight in the range of about 1,000 to 500,000 while containing in the range of about 0.005 to about 10 wt. % nitrogen and being useful as an oil additive having dispersancy properties, said oil soluble addition product being a condensation reaction product of:

(1) an anionically polymerizable monomer containing in the range of about 3 to 50 carbon atoms and at least one electron withdrawing group in such proximity to an olefinic bond that said bond is activated, said monomer being selected from the group consisting of:

(a) N,N (di C$_{1-10}$ hydrocarbyl) carbodiimides;
(b) monomers of the formula:

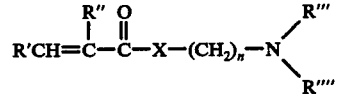

wherein X is oxygen or an NR'' group; $n$ is 2 to 5; R' and R'' are hydrogen or a C$_1$ to C$_4$ alkyl group; and R''' and R'''' are C$_1$ to C$_{12}$ hydrocarbyl groups; and (c) nitrile monomers of the formulae:

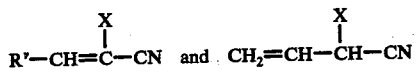

wherein R' is hydrogen or lower alkyl and X is selected from the group consisting of hydrogen, halogen, cyano and lower alkyl;
and (2) an oxidized ethylene copolymer comprising about 20 to 80 mole % ethylene and about 20 to 80 mole % propylene;
said reaction product being formed by reacting said monomer and copolymer either thermally at about 100° to about 200° C., or catalytically in the presence of an aqueous solution of strong base having a pH of at least 8 as catalyst.

2. A lubricating oil composition according to claim 1, wherein said monomer is said nitrile monomer (c).

3. A lubricating oil composition according to claim 2, wherein said monomer is acrylonitrile.

4. A lubricating oil composition according to claim 1, wherein said molecular weight is in the range of 10,000 to 200,000; and said ethylene copolymer contains up to 20 mole %, based on the molar amount of ethylene and propylene units, of olefin selected from the group consisting of olefins of the formula $RCH = CH_2$, where R is an aliphatic or cycloaliphatic radical of 2 to 48 carbons and diolefins of 4 to 26 carbon atoms.

5. A lubricating oil composition comprising a major amount of mineral lubricating oil and about 0.1 to 10 wt. % of an oil soluble addition product having a number average molecular weight in the range of about 10,000 to 200,000 containing in the range of about 0.005 to about 2 wt. % nitrogen and being useful as a V.I. improver-dispersant additive for lubricating oil, said oil soluble product being the condensation reaction product of 10 to 200 parts by weight of acrylonitrile with 100 parts by weight of an oxidized ethylene copolymer of about 20 to 80 mole % ethylene and about 20 to 80 mole % propylene, and having an oxygen content in the range of about 0.01 to 3 wt. % oxygen, and wherein said reaction product is formed by reacting said acrylonitrile and said oxidized copolymer in the presence of an aqueous solution of strong base having a pH of at least 8.

6. A lubricating oil composition according to claim 5, wherein said ethylene copolymer contains up to 20 mole % based on the molar amount of ethylene and propylene units, of olefin selected from the group consisting of olefins of the formula $RCH = CH_2$, where R is an aliphatic or cycloaliphatic radical of 2 to 48 carbons and diolefins of 4 to 26 carbon atoms.

7. A lubricating oil composition according to claim 5, wherein said ethylene copolymer consists of ethylene and propylene.

8. A process of preparing an oil soluble addition product having a number average molecular weight in the range of about 1,000 to 500,000 and containing in the range of about 0.005 to about 10 wt. % nitrogen, comprising the steps of reacting an oxidized ethylene copolymer comprising about 20 to 80 mole % ethylene and about 20 to 80 mole % propylene and having an oxygen content of from about 0.005 to 6%, with an anionically polymerizable monomer, either thermally at a temperature between about 100° and about 200° C., or catalytically at about 0° to 100° C. in the presence of an aqueous solution of strong base having a pH of at least 8 as catalyst, and then recovering said product, and wherein said anionically polymerizable monomer is selected from the group consisting of:
(a) N,N (di $C_{1-10}$ hydrocarbyl) carbodiimides;
(b) monomers of the formula:

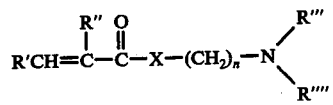

wherein X is oxygen or an NR" group; n is 2 to 5; R' and R" are hydrogen or a $C_1$ to $C_4$ alkyl group; and R''' and R'''' are $C_1$ to $C_{12}$ hydrocarbyl groups; and
(c) nitrile monomers of the formulae:

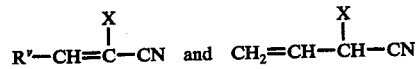

wherein R' is hydrogen or lower alkyl and X is selected from the group consisting of hydrogen, halogen, cyano and lower alkyl.

9. A process according to claim 8, wherein said monomer is said nitrile monomer (c), and wherein said process is carried out catalytically with said aqueous solution having a pH of at least 11.

10. A process according to claim 9, wherein said monomer is acrylonitrile.

11. A process according to claim 8, wherein said molecular weight is in the range of 10,000 to 200,000 and said ethylene copolymer contains up to 20 mole %, based on the molar amount of ethylene and propylene units, of olefin selected from the group consisting of olefins of the formula $RCH = CH_2$, where R is an aliphatic or cycloaliphatic radical of 2 to 48 carbons and diolefins of 4 to 26 carbon atoms.

12. A process for preparing an oil soluble addition product having a number average molecular weight in the range of about 10,000 to 200,000 and containing in the range of about 0.005 to about 2 wt. % nitrogen, said addition product being useful as a V.I. improver-dispersant additive for lubricating oil, said process comprising reacting in an inert solvent 100 parts by weight of oxidized ethylene copolymer consisting essentially of about 20 to 80 mole % ethylene and about 20 to 80 mole % propylene, and having an oxygen content in the range of about 0.005 to 6 wt. % with 10 to 200 parts by weight of acrylonitrile, at a temperature between about 0° to about 100° C. for about 0.2 to 25 hours in the presence of an aqueous solution of strong base having a pH of at least 11 as catalyst, and then recovering said product.

13. An oil soluble addition product having a number average molecular weight in the range of about 1,000 to 500,000 while containing in the range of about 0.005 to about 10 wt. % nitrogen and being useful as an oil additive having dispersancy properties, said oil soluble addition product being a condensation reaction product of:
(1) an anionically polymerizable monomer containing in the range of about 3 to 50 carbon atoms and at least one electron withdrawing group in such proximity to an olefinic bond that said bond is activated, said monomer being selected from the group consisting of:
(a) N,N (di $C_{1-10}$ hydrocarbyl) carbodiimides;
(b) monomers of the formula:

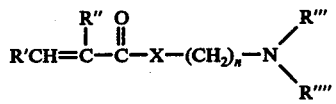

wherein X is oxygen or an NR" group; $n$ is 2 to 5; R' and R" are hydrogen or a $C_1$ to $C_4$ alkyl group; and R'" and R"" are $C_1$ to $C_{12}$ hydrocarbyl groups; and (c) nitrile monomers of the formulae:

wherein R' is hydrogen or lower alkyl and X is selected from the group consisting of hydrogen, halogen, cyano and lower alkyl;

and (2) an oxidized ethylene copolymer comprising about 20 to 80 mole % ethylene and about 20 to 80 mole % propylene;

said reaction product being formed by reacting said monomer and copolymer either thermally at about 100° to about 200° C., or catalytically in the presence of an aqueous solution of strong base having a pH of at least 8 as catalyst.

14. An oil soluble addition product according to claim 13, wherein said monomer is said nitrile monomer (c).

15. An oil soluble addition product according to claim 14, wherein said monomer is acrylonitrile.

16. An oil soluble addition product according to claim 13, wherein said molecular weight is in the range of 10,000 to 200,000; and said ethylene copolymer contains up to 20 mole % based on the molar amount of ethylene and propylene units, of olefin selected from the group consisting of olefins of the formula $RCH=CH_2$, where R is an aliphatic or cycloaliphatic radical of 2 to 48 carbons and diolefins of 4 to 26 carbon atoms.

17. An oil soluble addition product having a number average molecular weight in the range of about 10,000 to 200,000 containing in the range of about 0.005 to about 2 wt. % nitrogen and being useful as a V.I. improver-dispersant additive for lubricating oil, said oil soluble product being the condensation reaction product of 10 to 200 parts by weight of acrylonitrile with 100 parts by weight of an oxidized ethylene copolymer of about 20 to 80 mole % ethylene and about 20 to 80 mole % propylene, and having an oxygen content in the range of about 0.01 to 3 wt. % oxygen, and wherein said reaction product is formed by reacting said acrylonitrile and said oxidized copolymer in the presence of an aqueous solution of strong base having a pH of at least 8.

18. An oil soluble addition product according to claim 17, wherein said ethylene copolymer contains up to 20 mole % based on the molar amount of ethylene and propylene units, of olefin selected from the group consisting of olefins of the formula $RCH=CH_2$, where R is an aliphatic or cycloaliphatic radical of 2 to 48 carbons and diolefins of 4 to 26 carbon atoms.

* * * * *